United States Patent [19]

Gans et al.

[11] 4,269,897
[45] May 26, 1981

[54] FLEXIBLE IMPACT RESISTANT TRIM AND METHOD FOR MANUFACTURE THEREOF

[75] Inventors: Leo Gans, Teaneck, N.J.; Paul F. Bruins, Douglaston, N.Y.; Jay B. Shapiro, Roslyn, N.Y.; Myron Rothman, Westbury, N.Y.

[73] Assignee: Voplex Corp., Pittsford, N.Y.

[21] Appl. No.: 965,487

[22] Filed: Dec. 1, 1978

[51] Int. Cl.³ .............................................. B29F 3/10
[52] U.S. Cl. ................................. 428/419; 264/135; 264/174; 264/177 R; 428/31; 428/76; 428/457; 428/463
[58] Field of Search ............... 264/174, 177 R, 75, 264/135; 428/76, 419, 457, 463, 31

[56] References Cited

U.S. PATENT DOCUMENTS

| | | | |
|---|---|---|---|
| 3,136,676 | 6/1964 | Fisch | 264/171 |
| 3,440,129 | 4/1969 | Anselm | 264/174 |
| 3,769,150 | 10/1973 | King et al. | 428/457 |
| 3,809,568 | 5/1974 | Askew | 428/457 |
| 3,811,989 | 5/1974 | Hearn | 264/177 R |
| 3,843,475 | 10/1974 | Kent | 264/174 |
| 4,081,504 | 3/1978 | Wenrick et al. | 264/174 |

*Primary Examiner*—Jeffery R. Thurlow
*Attorney, Agent, or Firm*—Morgan, Finnegan, Pine, Foley & Lee

[57] ABSTRACT

A process for extruding resilient, impact resistant thermoplastic strips having a metallic appearance by providing a non-metallic film strip of a material selected from the group consisting of polysulfones and polyether sulfones and having a vapor deposited metallized surface, the film strip having melting and deformation temperatures higher than those of a transparent thermoplastic to be extruded thereon and a resiliency and an elasticity at least as high as the resiliency and elasticity of such transparent thermoplastic when extruded thereon and, while feeding such film strip through a cross-head die, extruding the transparent thermoplastic about the metallized film strip and the resilient, impact resistant thermoplastic strip having a metallic appearance produced thereby.

17 Claims, No Drawings

FLEXIBLE IMPACT RESISTANT TRIM AND METHOD FOR MANUFACTURE THEREOF

This invention relates to extruded thermoplastic products having a metallic appearance and, more particularly, to extruded products having a metallic appearance and which will sustain impact and return to original shape.

The automotive industry has, for the past several years, been developing vehicle bumpers which, on impact, distort and absorb impact energy and which, after impact, return to their original shape. Plastic covered metals and plastics have been employed as bumper materials for such purposes. The impact absorption properties of such bumpers is a safety and protective feature developed to protect the vehicle occupants during less serious accidents. The return of such bumpers to their original shape, after impact, minimizes property damage which, although secondary, is nevertheless of substantial importance to the design of an acceptable system.

While acceptable impact absorbing bumpers which will distort on impact and, after impact, return to their original shape have been developed and have been in use in automobiles for the past several years, the trim employed on such bumpers for aesthetic and decorative purposes has been subject to damage. Thus trims, such as metal strips, although recessed and protected in the bumper surface, become permanently bent and damaged when the bumper is impacted and distorted. While the bumper, itself, returns to its original shape and appearance, the decorative trim remains bent and damaged and must be removed and replaced. This, of course, detracts from the system. Leaving the metal trim off or removing the trim after it is damaged detracts from the appearance of the bumper and the vehicle.

Attempts to replace impact bumper metal trim with more flexible trim and trim which might return to its original shape after impact have not met with success. In one such attempt, a thermoplastic extruded trim having a metal foil encased therein and having an overall metallic appearance was substituted for the more rigid metal trim. However, on impact, the metal foil in such extruded trim either ruptured or was so stretched and distorted that even though the extrusion, itself, returned to its initial shape after impact, the shiny metallic appearance of the strip was destroyed.

In the instant invention, a trim having a metallic appearance for use on impact bumpers and which will return to its original shape and appearance after impact is provided. This is accomplished in the invention by extruding a plasticized, ultraviolet stabilized thermoplastic about a non-metallic film strip of a material selected from the group consisting of polysulfones and polyether sulfones and having at least one metallized surface and having a melting and deformation temperature higher than the melting and deformation temperature at which the plasticized thermoplastic is extruded and having a resiliency and an elasticity at least as high as the resiliency and elasticity of such thermoplastic when extruded thereon. The metallized surface is applied to the film strip by vapor deposition. The metallized surface may be coated, after the metal is applied, with a thermoplastic lacquer, such as polyvinylchloride copolymer lacquer having a dry thickness on the film strip of less than one mil.

Polysulfones and polyether sulfonates have been found to have the required melting and deformation temperatures and the required resiliency and elasticity and to be suitable as the non-metallic strip material in the practice of the instant invention. Film formable polysulfones and polyether sulfones having glass transition temperature in a range from about 120° C. to about 300° C., preferably, from about 170° C. to 250° C., are particularly suited as the film strip material. A metal, such as aluminum, is vacuum or vapor deposited on one surface of the film strip material and at least the vacuum or vapor deposited metallic surface of the film strip material is then coated with the polyvinylchloride copolymer lacquer. The film may be vacuum or vapor metallized, lacquer coated and then slit into strips of the desired width for the extruding or the film may first be slit and then metallized and lacquer coated. It is to be understood that the strip may be lacquer coated on both surfaces, if desired. Plasticized, ultraviolet stabilized, polyvinylchloride has been found to be particularly suited for extrusion over such film strips in the practice of the instant invention.

The extruded, thermoplastic strip so produced has a shiny metallic appearance and looks like a metal strip. The extruded strip and the metallized strip of polysulfone or polyether sulfone therein are resilient, elastic and impact resistant. Thus, when applied as a decorative trim on an automotive vehicle bumper or as bump guard on the sides of a vehicle and impacted or deflected, the extruded strip and the metallized strip of polysulfone or polyether sulfone therein withstand the shock and strains upon the impact of the bumper or bump guard without permanent deformation or rupture and, after impact, recover in size and shape. For purposes of description herein and in the appended claims "resilient," "resilience" and "resiliency" shall mean—capable of withstanding shock without permanent deformation or rupture—and "elastic" and "elasticity" shall mean—capable of recovering size and shape after deformation.

The apparatus shown in the drawings and described in U.S. Pat. No. 3,136,676 has been found to be particularly suited for the practice of the process of the present invention and for producing the resilient, impact resistant metallic appearing trim thereof. The drawings and description of such patent are incorporated herein by reference. A polysulfone or polyether sulfone film strip, with a metal vapor or vacuum deposited on one surface and coated on at least the metal deposited surface, but preferably, on both surfaces with a thermoplastic lacquer, such as a polyvinylchloride lacquer, is fed through the die in the extruder head. As the film strip is being fed through the die, plasticized, ultraviolet stabilized polyvinylchloride is fed into and heated in the extruder to its plastic state. The heated, plastic polyvinylchloride compound is forced by the extruder screw into and through the extruder die. The metallized surfaced, lacquer coated film strip is surrounded by the hot, plastic polyvinylchloride compound in the die cross-head, and with such hot, plastic emerges from the die, is cooled and hardened. Once cooled and hardened, the extruded product may be coiled or cut into strips of suitable length for handling and shipping.

The plasticized, ultraviolet stabilized polyvinylchloride of the instant invention may be clear or may be tinted. When clear and employed with film having a vacuum deposited aluminum surface, the extruded trim will have the appearance of chrome or polished steel. If the polyvinylchloride is tinted, such as with yellow, a gold, bronze or brass appearing plastic trim will be produced.

While plasticized, ultraviolet stabilized polyvinylchloride copolymer has been found to be particularly suited for use as the extrudate in the practice of the instant invention other elastomeric transparent plastics which are weather and ultraviolet resistant might also be used. Such other plastics include, ethylene-vinylacetate copolymers, thermoplastic polyester rubber and thermoplastic aliphatic polyurethane elastomers.

The extruded thermoplastic trim having a metallic appearance produced in accordance with the instant invention withstands impacts of the magnitude encountered with impact absorption bumpers and can be deformed and strained and will recover without permanent deformation or rupture and without loss of the original lustrous metallic appearance. The exact mechanism by which this is accomplished is not known and not deemed necessary for the invention. However, it is thought that the thin metallic surface, vapor or vacuum applied to the film and then lacquer coated ruptures and breaks up when the extruded trim is stretched and that a multitude of invisible microscopic cracks are formed in the metallic surface. The absence of delamination and the excellent bond which forms between the vapor or vacuum applied metal and the film strip is believed to occur because of the porosity of the metal coating and the penetration and impregnation of the thermoplastic lacquer through such porous coating to the film strip and the development of a bond therewith. Thus, since the vapor or vacuum applied metal is bonded by the thermoplastic lacquer to both the film strip and the extrudate, such microscopic cracks close when the trim retracts to its original length and shape without evidence of delamination. The lacquer solvent is also a solvent for the plastic of the film strip. Thus, the bond between the lacquer coating and the interface of the plastic film strip, at the areas where the lacquer coating migrated through the pores of the vapor or vacuum deposited metal coating to the film strip surfaces, assists in maintaining the integrity of the metal coating with the film strip when the trim is impacted, strained and recovers. Likewise, because the molten plastic polymer chains of the plasticized polyvinylchloride during the extruding co-mingle and intertwine with the lacquer polymer chains, the integrity of the bond between the extrudate, lacquer coating, vapor or vacuum deposited metal and film strip is further enhanced during impact, stretching and recovery of the extruded trim of the invention.

The invention of the instant application is further illustrated by the following examples:

EXAMPLE 1

Polyether sulfone film approximately two mils thick and formed from polyether sulfone obtained from I.C.I. under its designation VICTREX was vacuum metallized on one surface with aluminum to a metallized metal thickness of approximately five millionths of an inch and the aluminized surface was coated with a lacquer of polyvinylchloride copolymer, such as Union Carbide's VMCH dissolved in methyethyketone to a dry thickness of just under one mil. The metallized and lacquered film was then slit into strips about one-half inch wide and fed into a cross-head die of an extruder. Simultaneous with the feed of the slit film to the cross-head, plasticized, ultraviolet stabilized polyvinylchloride was fed to the extruder, heated to a temperature of about 300°–350° F. to form a hot, plastic mass and the plastic mass was forced by the extrusion screw into the cross-head and die and through the die with the lacquer coated, metallized polyether sulfone film strip. The trim so extruded was cooled to ambient temperature and cut into strips. The cooled strip had a metal appearance similar to the appearance of a chromium or polished steel strip. The metallized polyether sulfone film strip appeared in the extruded trim as a smooth adherent layer inside of the extrusion without any evidence of wrinkling, separation or distortion and imparted to the trim the appearance of metal. When impacted with an impact of the magnitude required in automotive bumper design, when bent, and when stretched and allowed to recover, there was no evidence of wrinkling, separation or distortion of the film strip or the metallic coating thereon and no visible evidence of separation or parting of the metal coating. After impact, bending, stretching and recovery, there was no change in the appearance of the product. There was no change in the appearance of the trim after prolonged exposure to ultraviolet radiation.

EXAMPLE 2

The procedure of Example 1 was repeated but, instead of polyether sulfone film made with I.C.I. material, a film of polysulfone plastic, made and sold by Union Carbide Corporation as polysulfone UDELL, approximately two mils thick was metallized with aluminum approximately five millionths of an inch thick and then coated with a lacquer of polyvinylchloride copolymer dissolved in methylethylketone having a dry thickness just under one mil. Plasticized, ultraviolet stabilized, polyvinylchloride was heated to a temperature of about 300°–350° F. to form a hot, plastic mass and was extruded about the metallized, lacquer coated film strip in the cross-head die. The appearance of the trim so extruded and the performance thereof on impact, stretching, recovery, bending and after ultraviolet radiation were substantially identical to the trim of Example 1.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a process for extruding resilient, impact resistant thermoplastic products with at least one visible region having a metallic appearance, the steps comprising providing a non-metallic film strip of a material selected from the group consisting of polysulfones and polyether sulfones and having at least one metallized surface, said non-metallic film strip with said metallized surface thereon having melting and deformation temperatures higher than the melting and deformation temperatures of the transparent thermoplastic material to be extruded thereon and a resiliency and an elasticity at least as high as the resiliency and elasticity of such transparent thermoplastic when extruded thereon and, while feeding said film strip through an extrusion die with said metallized surface facing in the direction where, in the extruded product, said metallic appearance is to be visible, thermally extruding around said metallized surface film strip said transparent thermoplastic material thereby forming from said film strip and said transparent thermoplastic material a flexible, impact resistant thermoplastic product.

2. A process, as recited in claim 1, in which the non-metallic film strip is a polyether sulfone.

3. A process, as recited in claim 1, in which the non-metallic film strip is a polysulfone.

4. A process, as recited in claim 1, in which the transparent thermoplastic material is selected from the group consisting of polyvinylchloride and copolymers thereof.

5. A process, as recited in claim 4, in which the transparent thermoplastic material is polyvinylchloride.

6. A process, as recited, in claim 1, in which a protective surface of transparent, thermoplastic lacquer is provided over the metallized surface of the non-metallic strip fed to the die.

7. In a process for extruding resilient, impact resistant thermoplastic products with at least one visible region having a metallic appearance, the steps comprising
providing a film strip of a material selected from a group consisting of polysulfones and polyether sulfones and having at least one metallized surface, while feeding said film strip through an extrusion die with the metallized surface facing in the direction where, in the extruded product, said metallic appearance is to be visible, thermally extruding around said film strip a transparent thermoplastic material selected from the group consisting of ultraviolet stabilized polyvinylchloride and ultraviolet stabilized copolymers of polyvinylchloride thereby forming from said film strip and said transparent thermoplastic material a flexible, impact resistant thermoplastic product.

8. A process, as recited in claim 7, in which said film strip material is polysulfone.

9. A process, as recited in claim 7, in which said film strip material is polyether sulfone.

10. An extruded thermoplastic impact resistant product with at least one visible region having a metallic appearance said product comprising a non-metallic film strip of a material selected from the group consisting of polysulfones and polyether sulfones and having at least one metallized surface and a transparent thermoplastic material extruded about said non-metallic film strip having a melting and deformation temperature higher than the melting and deformation temperature of said transparent thermoplastic material and a resiliency and an elasticity at least as high as the resiliency and elasticity of such transparent thermoplastic, said non-metallic film strip forming with said transparent thermoplastic material a flexible, impact resistant product.

11. A product, as recited in claim 10, in which the non-metallic film strip is a polyether sulfone.

12. A product, as recited in claim 10, in which the non-metallic film strip is a polysulfone.

13. A product, as recited in claim 10, in which the transparent thermoplastic material is selected from the group consisting of polyvinylchloride and copolymers thereof.

14. A product, as recited in claim 13, in which the transparent thermoplastic material is polyvinylchloride.

15. An extruded, flexible, thermoplastic, impact resistant product with at least one visible region having a metallic appearance said product comprising a film strip of a material selected from a group consisting of polysulfones and polyether sulfones and having at least one metallized surface and a transparent thermoplastic material selected from a group consisting of ultraviolet stabilized polyvinylchloride and ultraviolet stabilized copolymer of polyvinylchloride extruded about said film strip and forming with said film strip a flexible, impact resistant product.

16. An extruded product, as recited in claim 15, in which said film strip material is polysulfone.

17. An extruded product, as recited in claim 15, in which said film strip material is polyether sulfone.

* * * * *